United States Patent [19]
Rolfe

[11] Patent Number: 5,954,450
[45] Date of Patent: Sep. 21, 1999

[54] METHOD OF IRRIGATION CONTROL

[76] Inventor: Gerald Rolfe, 9 Stane Close, Bishops Stortford, United Kingdom, CM23 2HU

[21] Appl. No.: 09/014,874

[22] Filed: Jan. 28, 1998

[30] Foreign Application Priority Data

Jan. 28, 1997 [GB] United Kingdom .................. 9701659

[51] Int. Cl.[6] .......................... E02B 11/00; A01G 27/00; A01G 25/00
[52] U.S. Cl. ................................ 405/37; 239/64; 239/69; 405/36
[58] Field of Search .................................. 405/37, 36, 74, 405/50; 239/65, 69, 64

[56] References Cited

U.S. PATENT DOCUMENTS

| | | |
|---|---|---|
| 2,577,337 | 12/1951 | Lancaster .................................. 405/37 |
| 3,426,539 | 2/1969 | Whear ........................................ 405/37 |
| 3,747,399 | 7/1973 | Treirat ..................................... 405/37 X |
| 4,026,467 | 5/1977 | Ayme' De La Chevrelie're . 405/37 X |

Primary Examiner—Dennis L. Taylor
Attorney, Agent, or Firm—Fildes & Outland, P.C.

[57] ABSTRACT

Method of controlling the operation of an irrigation system for irrigating an area of land or other terrain. The method comprising the steps of monitoring a condition of the material of the land by a sensor located below the surface thereof, and controlling irrigation structure for irrigating the land area in response to the monitored condition of the material thereof and disturbing the material of the land in the vicinity of the sensor to maintain the material in operational monitoring contact with the sensor.

7 Claims, 5 Drawing Sheets

METHOD OF IRRIGATION CONTROL

FIELD OF THE INVENTION

This invention relates to irrigation control, in particular to apparatus operable in dependence upon a condition, such as the water content, of an area of land or other terrain to be irrigated and, also, to an irrigation system controllable by such apparatus, as well as to an associated method.

DESCRIPTION OF THE PRIOR ART

Known techniques for controlling the operation of an irrigation system can include, generally, a sensor associated with an area of land or other terrain to be irrigated in dependence upon a condition, such as the water content, thereof and arranged to monitor that condition, such that when, say, the water content of the area of land with which the sensor is associated, reaches a predetermined minimum value, the sensor is used to commence operation of the irrigation system to rehydrate the land area to raise its water content to at least a required value which is greater than the predetermined minimum value. Such known techniques for controlling the operation of an irrigation system can include a sensor for monitoring the weight of the material, such as soil, of the land area, including its water content, in the vicinity of the sensor, and hence the corresponding pressure exerted upon the sensor. Examples of this known type of weight-based technique for controlling the operation of an irrigation system are disclosed in U.S. Pat. No. 5,329,081 (Jones), U.S. Pat. No. 5,351,437 (Lishman), WPI Abstract Accession No. 78-H2993A/38 (DE-A-2709793 - Haase), WPI Abstract Accession No. 77-K2057Y/46 (DE-A-2618540 WEDELKTN).

With these known techniques, as well as other previous arrangements, for controlling the operation of an irrigation system employing a weight- or pressure-based sensor, it has been found that, when the sensor is located beneath the soil, usually just below ground level, of the land area whose water content, or other condition, is to be monitored, the soil in the vicinity of the sensor can be subjected to a natural binding effect during drying (dehydration) of the soil, particularly in very dry weather conditions. As a consequence, the soil, which should otherwise be in contact with the sensor for the sensor to be capable of monitoring the water content of the soil in the vicinity thereof, does not interface properly with the sensor, thereby affecting the monitoring capability of the sensor and, as a result, providing spurious operation of the associated irrigation system.

Thus, it is important that the soil whose water content or other condition is being monitored by the sensor, is maintained in operational contact with the sensor, for the sensor to be able to carry out its monitoring function efficiently in order to operate the associated irrigation system at the correct times and, thus, maintain the water content or other condition of the corresponding area of land or other terrain at the required level.

SUMMARY OF THE INVENTION

Thus, the present invention sets out to provide irrigation control apparatus and an irrigation system controllable by such apparatus, as well as an associated method, which overcome, or at least substantially reduce, the major disadvantage associated with know irrigation control techniques, as discussed above.

Accordingly the presently inventive irrigation control apparatus and irrigation system provide an improvement over the prior art techniques discussed above, in that they comprise means which is adapted to be located within the material of the land area below the surface thereof and in the vicinity of the sensor and to disturb said material in the vicinity of the sensor when so-located within said material and in use, to maintain the material in operational monitoring contact with the sensor.

Such material disturbing means is preferably located above the sensor and may be movable reciprocably, preferably in a generally vertical direction.

Also, such material disturbing means may be arranged to disturb intermittently the material in which it and the sensor are located. Such movement of the material disturbing means may be enabled by means of a cable or cam arrangement, preferably drivable by an electric motor.

In one embodiment to be described hereinbelow, the material disturbing means comprises a plate, whilst in another embodiment, also to be described hereinbelow, such means comprises an upper flexible wall of an airtight housing constituting at least part of the sensor.

In one important application of the inventive apparatus and associated irrigation system, the sensor may be capable of monitoring the water content of the material in which it is located during use. In such circumstances, the sensor is preferably arranged to monitor the weight exerted upon it by the material, in which case, the sensor may be in the form of a pressure sensor.

Further, the sensor may be used to actuate a switch to commence operation of associated irrigation means, when the condition of the material monitored by the sensor is at, or reaches, a predetermined minimum value. Additionally or alternatively, the sensor may be arranged to actuate a or the switch to terminate operation of the irrigation means, when the condition of the material monitored by the sensor, is at, or reaches, a predetermined maximum value.

In the inventive method of controlling the irrigation of an area of land, which conventionally comprises monitoring a condition of the material of the land by means of a sensor located below the surface thereof and controlling operation of associated irrigation means in dependence upon the monitored condition or parameter of the material, there is provided an improvement whereby the material of the land in the vicinity of the sensor is disturbed, preferable intermittently, to maintain the material in operational monitoring contact with the sensor.

As discussed above in relation to the inventive apparatus and irrigation system, the inventive method preferably includes disturbing the material above the sensor. Again, the water content of the material can be monitored by the sensor, in which case, the sensor can monitor the weight exerted upon it by the material. A switch may be actuated by the sensor to commence operation of the associated irrigation means, when the monitored condition of the material is at a predetermined minimum value. Additionally or alternatively, the sensor can actuate a or the switch to terminate operation of the irrigation means, when the monitored condition of the material is at a predetermined maximum value.

Thus, and when, say, the material is soil and the water content of soil in the vicinity of, such as above, the sensor, for example, a pressure sensor, is at or above a predetermined value, for example, that sufficient to promote growth of any plants growing in the soil, or to maintain the soil in a required condition, the sensor is actuable by the pressure exerted upon it, to prevent irrigation of the area of soil material. When, however, the water content of soil material in the vicinity of, for example above, the pressure sensor is below that given value, then the sensor is actuable, as a result of the reduced pressure exerted upon it, to operate the irrigation means until the water content of the soil in the vicinity of the sensor reaches the predetermined value, at which time the correspondingly increased pressure exerted upon the sensor, causes further actuation of the sensor which, in turn, prevents further irrigation of the area.

Thus, it is evident that, in the majority of circumstances, it is the pressure exerted upon the sensor by the total weight of the soil or other material and the water contained within it which determines actuation of the sensor to control operation of the associated irrigation means.

The pressure sensor may comprise any suitable device, such as a pressure transducer or, as in the case of one preferred embodiment to be described in greater detail hereinbelow, an at least partially inflated bag or other flexible walled container which may be connected, via, say, piping or other suitable means, to a pressure actuable switch for controlling operation of the associated irrigation means.

Thus, and as discussed above, the apparatus and system according to the invention include the improvement of means arranged to disturb, in the vicinity of the sensor, the soil or other material of the area of land or other terrain to be irrigated. By this means, the soil or other material in the vicinity of the sensor, preferably thereabove, can be disturbed to prevent settling and/or hardening thereof, due to prolonged periods of, say, dry weather conditions, which might otherwise prevent the sensor from being operated properly.

Movement of the disturbing means may be of any desired nature, as long as it disturbs the soil or other material in the vicinity of the sensor. In a preferred embodiment to be described hereinbelow, that movement is reciprocable and in a generally vertical direction and may be effected periodically. The plate, as in one preferred embodiment, or other suitable disturbing means, may be movable by any suitable means, such as a cable having one end attached to the plate or other disturbing means and its other end attached to, say, an electric motor which is preferably reversible or provided with cam means to cause any desired reciprocable vertical movement of the disturbing means. Alternatively, the plate or other disturbing means is so movable by means of a motor and cam arrangement which acts directly thereupon and which is located, along with the pressure sensor and disturbing means, within the soil or other material of the area of land or other terrain whose irrigation is to be controlled.

When the disturbing means is in the form of a plate and the sensor is of the type which undergoes physical movement during pressure changes, such as an at least partially inflated bag or other flexible walled container, then the plate preferably acts upon the sensor such that not only can the plate undergo movement to disturb the soil or other material in which it is located but also the pressure exerted upon the sensor by the weight of soil or other material above it can be transmitted thereto via the plate.

The pressure at which a pressure sensor is actuable to control operation of the associated irrigation system may be adjustable to suit particular operating conditions.

BRIEF DESCRIPTION OF THE DRAWINGS

In order that the invention may be more fully understood, preferred embodiments in accordance therewith will now be described by way of example and with reference to the accompanying drawings in which.

DETAILED DESCRIPTION OF THE PREFERRED EMBODIMENTS

Figure 1:
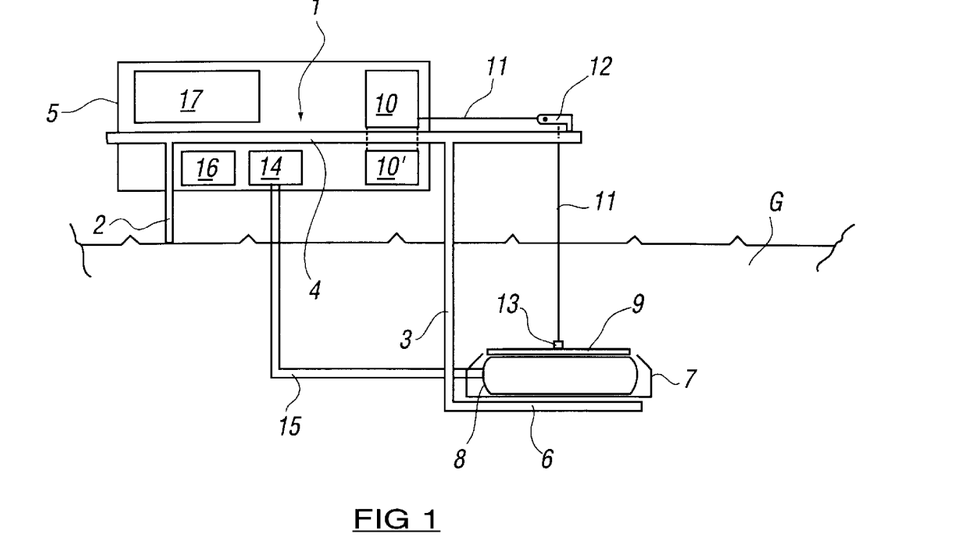
FIG. 1 is an elevational, partially-diagrammatic view of a first embodiment of apparatus for controlling the operation of an irrigation system.

Referring firstly to FIG. 1, a first embodiment of apparatus for controlling the operation of an associated irrigation system comprises a support frame indicated generally at 1 and including a pair (only one shown) of legs 2 resting on the ground C and another pair (only one shown) of legs 3 sunk into the ground. The legs 2,3 are connected to and support a framework platform 4 which, in turn, supports a waterproof casing 5 housing certain components of the apparatus, as will be described hereinbelow.

The lower ends of the vertical legs 3 below the level of the ground G have, projecting therefrom normally thereto, a horizontal platform 6 on which is supported a housing 7 containing an air-inflated bag 8. Positioned above the bag 8 is a plate 9 which is connected operably to an electric motor (not shown) and gearing (also not shown) which are housed at 10 within the casing 5, by means of a cable 11 attached at one end 13 to the plate 9 and passing over a pulley arrangement 12 fixed to the right hand outer end of the framework platform 4. The electric motor and associated gearing 10 are arranged to move the plate 9 intermittently in a generally vertical direction and in a reciprocating manner, to disturb the ground soil above the bag 8. For this purpose, the motor is provided with a time switch indicated diagrammatically at 10.

The interior of the inflated bag 8 is connected to an adjustable pressure switch, shown diagrammatically at 14 and housed within the casing 5, via piping 15 at least partially buried in the ground G. That pressure switch 14 is arranged to control the associated irrigation system via a motorised valve, shown diagrammatically at 16, connected operably to that system.

Other components, such as electrical circuitry, associated with the apparatus, are housed within the waterproof casing 5, as indicated diagrammatically at 17. Suitable electrical and any other necessary connections are provided within the casing 5 between the components 10, 10', 14, 16 and 17. Further, manual controls for the apparatus, for example, for adjusting the time switch 10' for the intermittent operation of the electric motor 10 for reciprocating movement of the plate 9 and, also, the pressure switch 14, may be mounted on the exterior of the casing 5.

In operation of the apparatus described above in relation to the embodiment shown in FIG. 1, when the water content of the ground soil in the vicinity of, and particularly above, the inflated bag 8 is greater than a given value thereof, such that the bag is compressed, the interior of the bag is at an increased pressure which, via the piping 15, maintains the pressure switch 14 in its OFF state, which, in turn, maintains the motorised valve 16 in its OFF state, so that the associated irrigation system is inoperative. As the soil dries out, for example, with no rain or with plants growing in the soil taking up the water therefrom, such that the water content of the soil in the vicinity of the bag 8 is reduced and eventually reaches at least the given value, the bag expands from its previous compressed condition, such that the interior of the bag 8 is at a reduced pressure which switches the pressure switch 14 to its ON state, which, in turn, switches the motorised valve 16 to its ON state, thereby causing the associated irrigation system to operate and distribute water over the surrounding area of ground G.

When the water content of the ground soil in the vicinity of the bag 8 increases to at least the given value, as a result of such irrigation, then the pressure switch 14 is returned to its OFF state and, as a consequence, so too is the motorised valve 16, thereby terminating operation of the associated irrigation system.

For given periods, such as whilst the pressure switch 14 and motorised valve 16 are in their OFF states, or, alternatively, during the whole cyclic operation of the apparatus, the plate 9 is moved, by means of the motor 10 and associated cable 11 attached thereto, reciprocably vertically with respect to the inflated bag 8, to disturb the ground soil in the vicinity thereof and, particularly, thereabove, to ensure that the soil is maintained in operative engagement with the bag, so that the pressure exerted upon the bag by the combined weight of the surrounding soil and water contained therein corresponds to the given value at which the associated irrigation system is operated, namely, when the pressure switch 14 is changed between its ON and OFF states.

Figure 2:
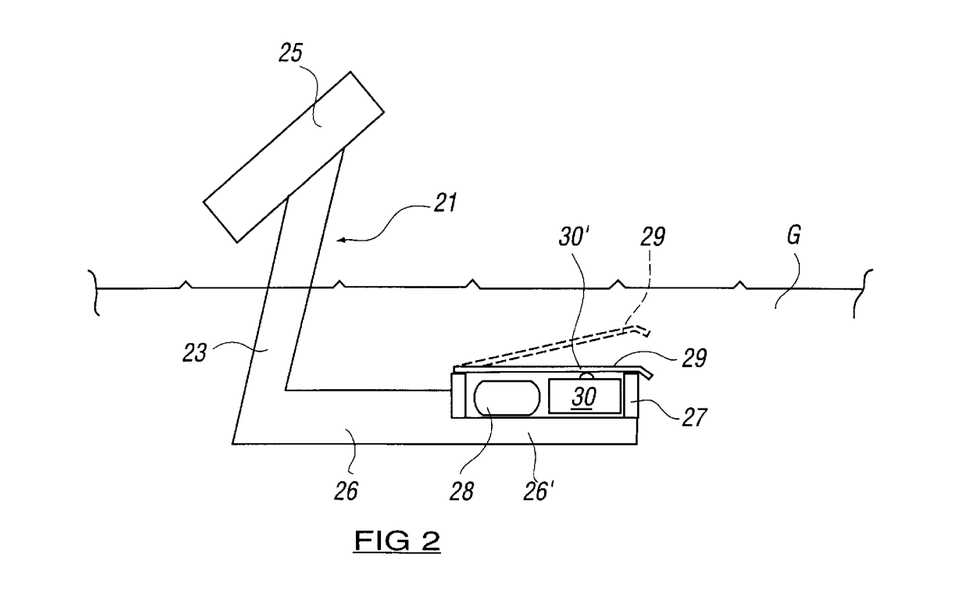
FIG. 2 is an elevational, partially-diagrammatic view of a second embodiment of apparatus for controlling the operation of an irrigation system.

Turning now to FIG. 2 of the drawings, a second embodiment of apparatus for controlling the operation of an associated irrigation system comprises a support frame indicated generally at 21 and having an upstanding hollow leg 23 which is inclined to the vertical and which is sunk into the ground C. The upper end of the leg 23 supports a waterproof casing 25 housing certain other components of the apparatus, as will be described hereinbelow.

The lower end of the leg 23 below the level of the ground G has, projecting therefrom, a horizontal hollow portion 26, with a horizontal platform 26' at its right hand free end, on which is supported a housing 27 containing an air-inflated bag 28. Positioned above and in contact with the bag 28 is a plate 29 which is connected operably to an electric motor 30 via a cam arrangement which is shown only partially at 30'. The electric motor 30 and associated cam arrangement 30', housed within the housing 27, are arranged to move the plate 29 intermittently in a generally vertical direction and in a reciprocating manner, to disturb the ground soil in the vicinity, and particularly above, the bag 28. For this purpose, the motor 30 is provided with a time switch (not shown) housed within the casing 25. In FIG. 2, the reciprocably movable plate 29 is shown in its lower position in full lines and in its upper position, in dashed lines.

The interior of the inflated bag 28 is connected to an adjustable pressure switch (also not shown), housed within the casing 25, via piping (again not shown) which is similar to the piping 15 of the first embodiment described above in relation to FIG. 1. That piping extends through the hollow interiors of the horizontal leg portion 26 and upstanding leg 23 into the housing 25.

That pressure switch, as in the case of the pressure switch 14 of the first embodiment of FIG. 1, is arranged to control the associated irrigation system via a motorised valve which is connected operably to that system and which may be housed in the casing 25.

Other components, such as electrical control circuitry, associated with the apparatus, are also housed within the waterproof casing 25 and, further, suitable manual controls for the apparatus, for example, for adjusting the time switch for the intermittent operation of the electric motor 30 for reciprocating movement of the plate 29 and, also, the adjustable pressure switch, may be mounted on the exterior of the casing 25.

Operation of this second embodiment of irrigation control apparatus is essentially the same as that described for the first embodiment discussed above in relation to FIG. 1.

Figure 3:
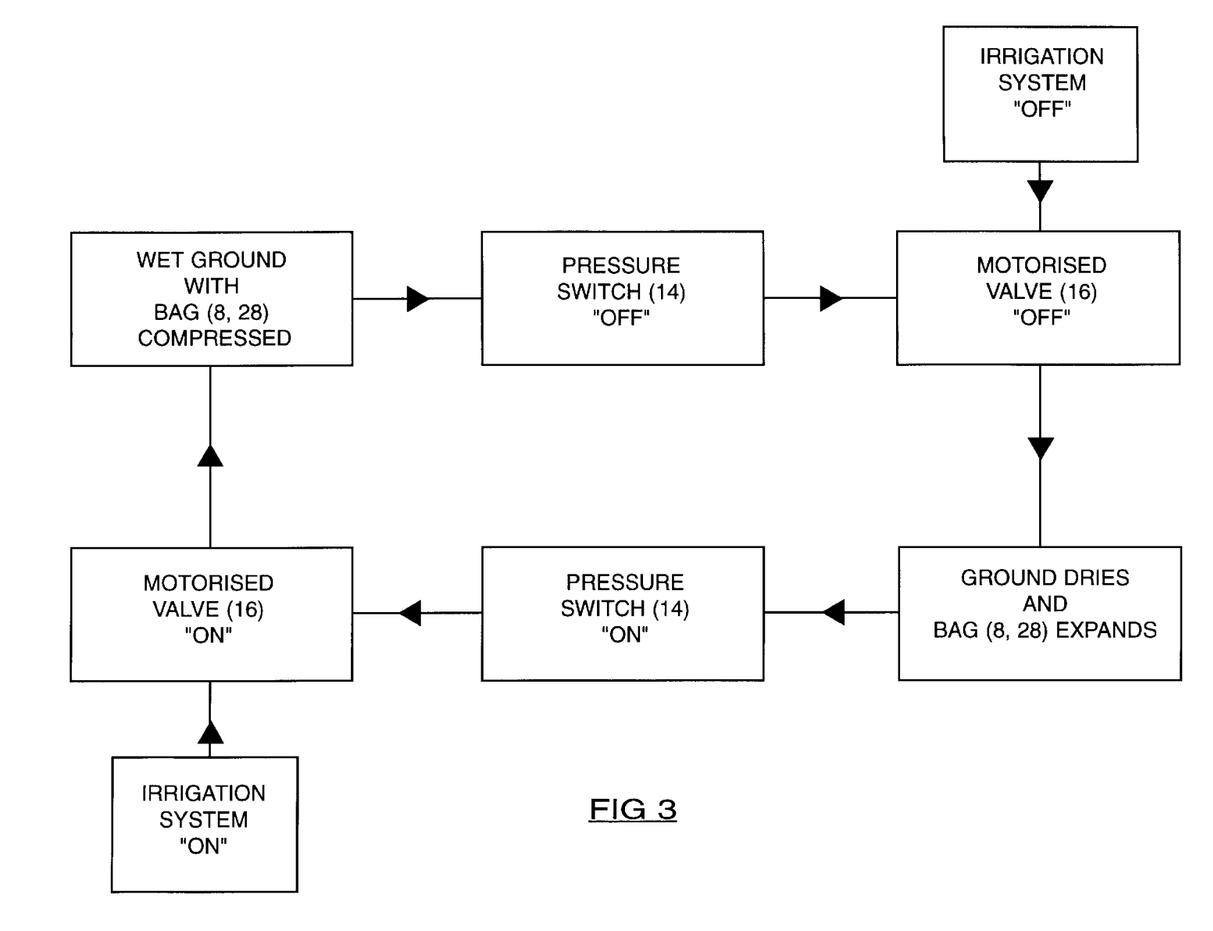
FIG. 3 is a diagrammatic flow chart illustrating the cyclic operation of both first and second embodiments of apparatus shown in respective FIGS. 1 and 2.

The cyclic operation of both the first and second embodiments of apparatus and associated irrigation system is illustrated diagrammatically in the flow chart shown in FIG. 3.

The irrigation system associated with the two embodiments of inventive control apparatus described above in relation to FIGS. 1 to 3 of the drawings and operable by the motorised valves (16), may take any suitable form, depending on its particular application.

A third embodiment of apparatus for controlling the operation of an associated irrigation system, as shown in FIGS. 4 to 7, comprises a support frame, indicated generally at 41, having an upstanding hollow leg 43 which is inclined to the vertical and whose lower end is located within the soil S of an area of land whose irrigation is to be controlled, below the surface level L thereof. The upper end of the leg 43 supports a waterproof thermoplastics casing 45 housing mainly electrical components of the apparatus, such as, a system mode display and control switches, neon laps for indicating the particular system mode and override switches, all indicated at 42, a main electrical connection board 52 including an electrical power input to circuitry and other associated electrical components from an electrical power supply cable 53. At 54, there is shown an adjustable pressure switch and a variable range pressure switch which can be adjusted from outside the casing 45, whilst an electric timer is provided at 55, which is adjustable over a 24 hour period and can be preset to selected modes of operation of the apparatus, as required.

Figures 4, 5, 6:
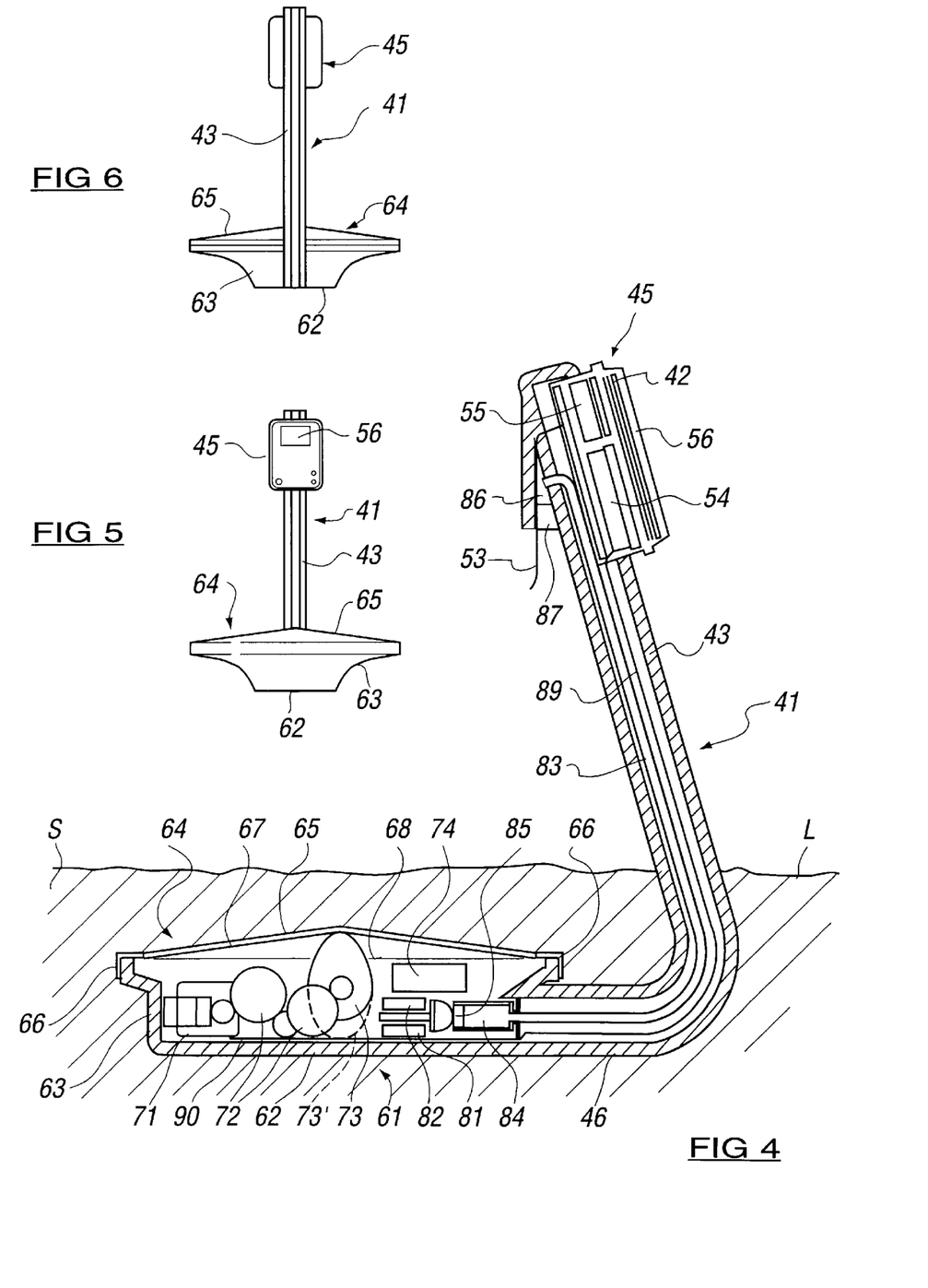
FIG. 4 is a side elevation, in partial section, of a third embodiment of apparatus installed in the soil of a land area whose irrigation is to be controlled thereby.
FIG. 5 is a front elevation of the apparatus shown in FIG. 4, before installation.
FIG. 6 is a rear elevation of the apparatus shown in FIG. 4, again before installation.
Figure 7:
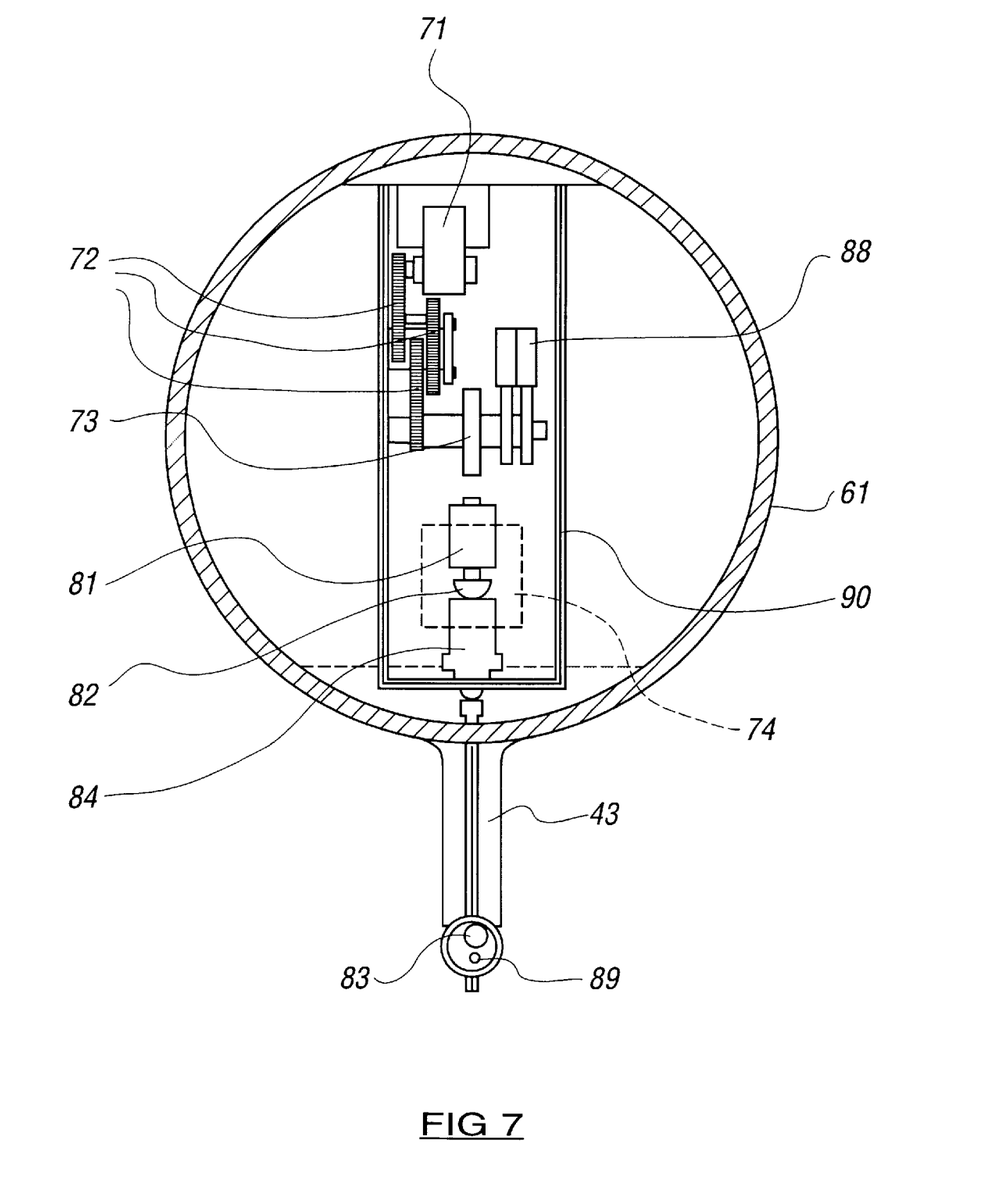
FIG. 7 is a plan view, in partial section, of the apparatus shown in FIGS. 4 to 6.

The casing 45 has a transparent polycarbonate cover 56 through which the various indicating components, such as the neon lamps (42), can be viewed. The lower end of the hollow leg 43 is located below the surface level L of the soil S and has a horizontal extension 46 thereof communicating with a generally circular, airtight housing indicated generally at 61 and comprising a bottom wall 62, a circular side wall 63 and a top wall indicated generally at 64.

The top wall 64 of the underground airtight housing 61 comprises firstly a waterproof, flexible rubber, upper membrane 65 whose periphery is sealed, in an air and watertight manner, to the top circumference of the side 63 by means of an annular collar 66. Secondly, an intermediate support 67 of a stiff or semi-stiff but flexible polyethylene material is provided to support the upper membrane 65 and is arranged to flex upwardly and downwardly, in a reciprocating manner, in unison with the membrane 65. Thirdly, an annular, lower rigid plate 68 is provided for supporting the intermediate support 67, and hence the membrane 65, in its lowermost position when a cam 73 is at its lower position, as described below.

Accommodated within the underground housing 61 are a reversible electric motor 71, such as an induction motor, controllable by the timer 55, and a cam arrangement comprising reduction gearing 72 for slowly rotating at high torque the lifting cam 73 through 180° in alternate reciprocable rotations controlled by a cam-operated micro-switch (88) associated with the reversible motor 71. The upper position of the cam 73 is shown in solid line, with the lower position thereof shown in dashed line at 73'. A low voltage transformer 74 is provided for a low voltage supply to a solenoid valve 81 whose valve member 82 is biased into an open position, as shown, with respect to the lower end connection 84 of a polyethylene pipe 83 by means of a spring 85. The pipe 83 communicates the interior of the housing 61 with the atmosphere, via an air vent 86 and a filter 87 at the upper end of the leg 43, when the valve member 82 is in its open position, again as shown in FIG. 4, representing the "HOLD" mode of the apparatus in which the interior of the housing 61 is at atmospheric pressure.

Figure 8A:
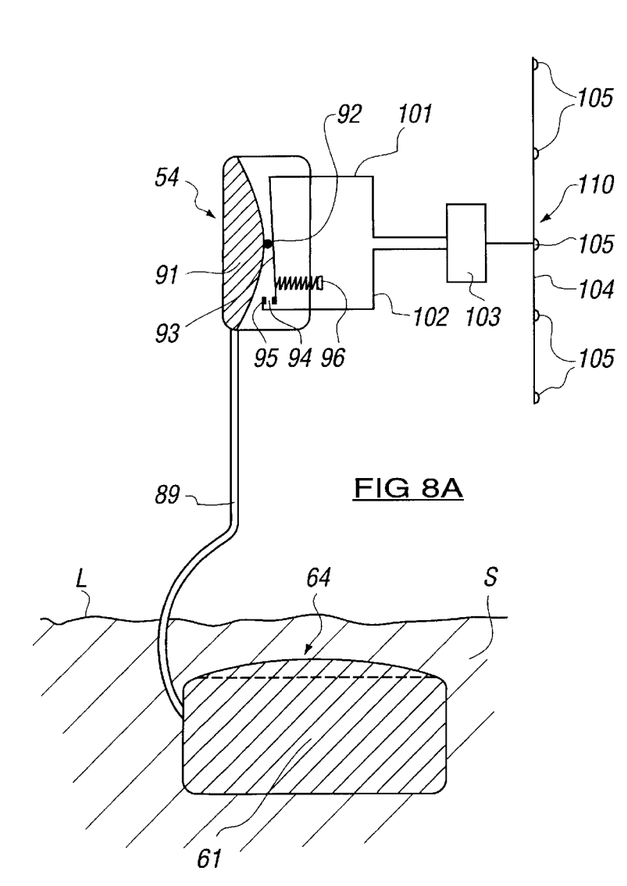
FIGS. 8A and 8B are respective diagrammatic views of the apparatus shown in FIGS. 4 to 7, not to scale and again diagrammatically, connected to an irrigation system.
Figure 8B:
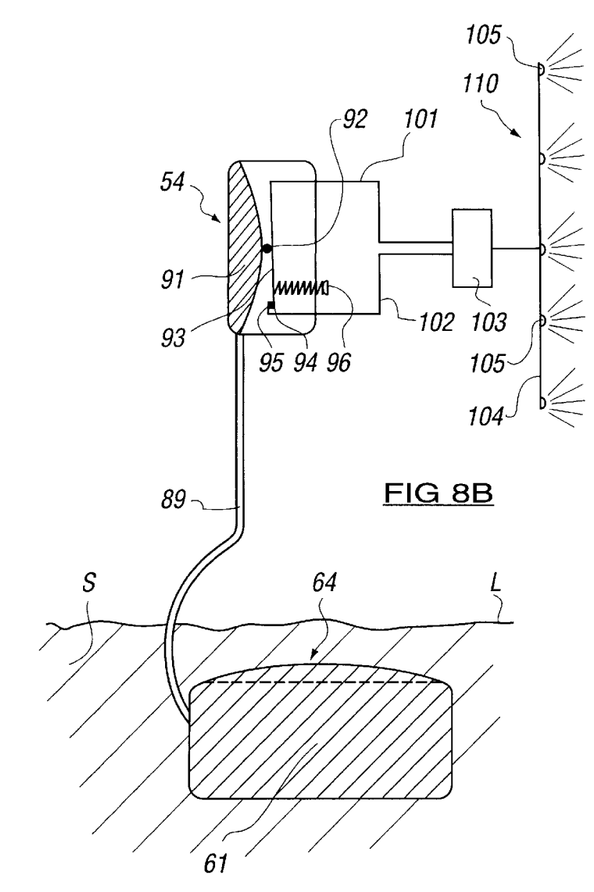

A small bore tube 89 communicates the interior of the housing 61 with the adjustable pressure switch 54, as shown in greater detail in FIGS. 8A and 8B. That pressure switch 54 comprises, say, an inflatable diaphragm element 91 whose interior is in communication with the upper end of the tube 89 and which is in engagement at 92 with a movable contact 93 of a switch 94. The gap between the movable contact 93 and a fixed contact 95 of the switch 94 is adjustable by means of a screw 96, whilst respective conductors 101, 102 connect those contacts 93, 95 to an operating valve 103 of an irrigation system shown generally at 110.

In that irrigation system, piping 104 is connectable to a pressurised water source via the valve 103 and, also, is provided with spray nozzles 105.

Thus, when the irrigation control apparatus is in its "OFF" state, with the valve member 82 in its open position under the bias of the spring 85 and, as a result, the pressure within the housing 61 and, hence, the diaphragm element 91 is at atmospheric pressure, and the cam 73 is in its "HOLD" mode in its upper position, as shown in solid line in FIG. 4, supporting the soil S above the top wall 64 of the housing 61, the switch contacts 93, 95 are closed and power to the irrigation system is "OFF". As a consequence the apparatus is effectively inoperative, as is the irrigation system 110.

When the control apparatus is in its "ON" state, that is to say, when the electric timer 55 reaches a predetermined time and, as a result, the apparatus is supplied with power, the valve member 82 is moved into its closed position with respect to the lower end connection 84 of the pipe 83 against the bias of the spring 85 and the motor 71 is energised to rotate the cam 73 through 180' into its lower, "TEST" mode position, as shown in dashed line in FIG. 4, at which time the motor 71 is de-energised by the microswitch 88 and the cam 73 is held in its "TEST" mode in its lower position.

If in this "TEST" mode, with the valve member 82 is in its closed position, the pressure within the housing 61 reduces to a predetermined minimum value as a consequence of the weight exerted upon the upper membrane 65 and support 67 decreases due to a reduction in the water content of the soil S thereabove, then the pressure in the element 91 of the pressure switch 54 correspondingly reduces with a corresponding partial deflation of the element 91, whereby the movable switch contact 93 is brought into conductive engagement with the fixed switch contact 95, thereby commencing operation of the associated irrigation system 110, as shown as in FIG. 8B

After a while, and with the cam 73 still in its lower position ("TEST" mode), the water content of the soil S increases due to such irrigation and the pressure within the housing 61 is correspondingly increased, thereby separating the switch contact 93, 95. As a consequence, operation of the irrigation system 110 is terminated, as shown in FIG. 8A.

The screw 96 can be adjusted, to alter the gap between the contact 93, 95, thus changing the pressure within the element 91 at which operation of the associated irrigation system is commenced or terminated, whilst the cam 73 is in its lower, "TEST" mode position.

In accordance with the invention, and in order to maintain the soil S in operational contact with the flexible upper membrane 65 and intermediate support 67, for commencing and terminating operation of the irrigation system 110 in dependence of the water content of the soil S, the motor 71 is started at predetermined intervals, that is to say, intermittently, to operate the reduction gearing 72 and, hence, rotate the cam 73 between its "HOLD" and "TEST" modes. As discussed above, that cam 73 is rotatable slowly, at high torque, through 180° in alternate reciprocable rotations, as controlled by the microswitch 88. As a consequence of such reciprocable rotating movement of the cam 73, the intermediate support 67, along with the upper membrane 65, are moved reciprocably in a vertical direction, to disturb the soil S in the vicinity thereof, thereby maintaining the soil S in operational monitoring contact therewith. This inventive feature overcomes the disadvantages associated with the previous irrigation control arrangements, in that any natural binding effect experienced by the soil S during drying (dehydration) of the soil, particularly in very dry weather conditions, does not prevent the soil from being maintained in operational monitoring contact with the top wall 64 of the sensor.

In general terms, therefore, the embodiments of inventive apparatus discussed above in relation to the drawings, provide novel and inventive techniques for monitoring the change of weight of the soil in the vicinity of the sensor, for commencing and terminating the operation of an associated irrigation system, to maintain the water content of the soil at a given value or within a given range of values.

After installation, the required water content levels are set and are finally adjusted using the adjustment screw 96 of the pressure switch 54, whereby operation of the apparatus and hence the irrigation system can be adjusted to suit particular soil and weather conditions. The apparatus is capable of running completely automatically but can be overridden if required via the above-ground controls. Similarly, the "HOLD" and "TEST" modes can be set by the timer 55, to operate at required time intervals and periods.

What I claim is:

1. A method of controlling the irrigation of an area of land, comprising the steps of:

monitoring a condition of the material of said land by means of a sensor located below the surface thereof; and controlling irrigation means for irrigating said land area in response to the monitored condition of the material thereof, disturbing the material of said land in the vicinity of the sensor to maintain the material in operational monitoring contact with the sensor.

2. A method according to claim 1, wherein the step of disturbing the material includes disturbing said material above the sensor located below the surface of the area of land.

3. A method according to claim 1, wherein the step of disturbing the material includes intermittently disturbing said material.

4. A method according to claim 1, wherein the step of monitoring the condition of the material includes monitoring a water content of said material with the sensor.

5. A method according to claim 1, wherein the step of monitoring the condition of the material includes monitoring the weight exerted upon the sensor by the material.

6. A method according to claim 1, further comprising the step of actuating a switch of the sensor to commence operation of said irrigation means when the monitored condition of said material equals a predetermined minimum value.

7. A method according to claim 6, further comprising the step of actuating the switch to terminate operation of said irrigation means when the monitored condition of said material is equal or greater than a predetermined maximum value.

* * * * *